United States Patent
Graham et al.

[15] 3,680,122
[45] July 25, 1972

[54] PILOT WARNING INDICATOR SYSTEM UTILIZING A TRANSMISSION OF SIGNALS WITHIN THE ABSORPTION BAND OF THE OXYGEN SPECTRUM

[72] Inventors: Walton Graham, Roslyn; Robert R. Keegan, Scarsdale, both of N.Y.

[73] Assignee: Control Data Corporation, Minneapolis, Minn.

[22] Filed: March 13, 1970

[21] Appl. No.: 19,246

[52] U.S. Cl. .................................343/112 CA, 343/112 D
[51] Int. Cl. ...........................................G01s 1/12
[58] Field of Search..................343/112 A, 112 D, 112 CA

[56] References Cited

UNITED STATES PATENTS

| 2,568,568 | 9/1951 | Stansbury | 343/112 A |
| 3,333,270 | 7/1967 | Page | 343/112 D |
| 3,208,064 | 9/1965 | Morrel | 343/112 CA |
| 2,886,796 | 5/1959 | Wallace | 343/112 A |

Primary Examiner—Carl D. Quarforth
Assistant Examiner—J. M. Potenza
Attorney—Darby & Darby

[57] ABSTRACT

A proximity indicator system for aircraft which includes a radio signal transmitter having a predetermined output frequency range within an absorption band of the spectrum of a major invariable constituent of the atmosphere. A transmit antenna, which may be rotatable, is employed to propagate an output frequency within the predetermined range which may be responsive to variations in ambient atmosphere density and hence altitude. A rotatable antenna is connected to a radio receiver which has a predetermined amplitude threshold receiving level and is attuned to at least a portion of the output frequency range. A display is connected to the receiver to indicate reception of a signal and, optionally its direction. The output signal may be monitored by a receiver which contains a modulating circuit to compare a received signal with the monitored signal, the resultant being representative of any altitude differential which may exist between the respective signal sources. Resultants which represent more than a predetermined maximum differential will be rejected. A rotatable transmit antenna may supply bearing information regarding the output signal to a modulating circuit simultaneously with a signal representing air speed, whereby the output signal is impressed with a bearing velocity component. The output signal is monitored and compared with a similarly encoded received signal to reject information derived from a receding source (or other sources not representing a near term collision threat).

20 Claims, 4 Drawing Figures

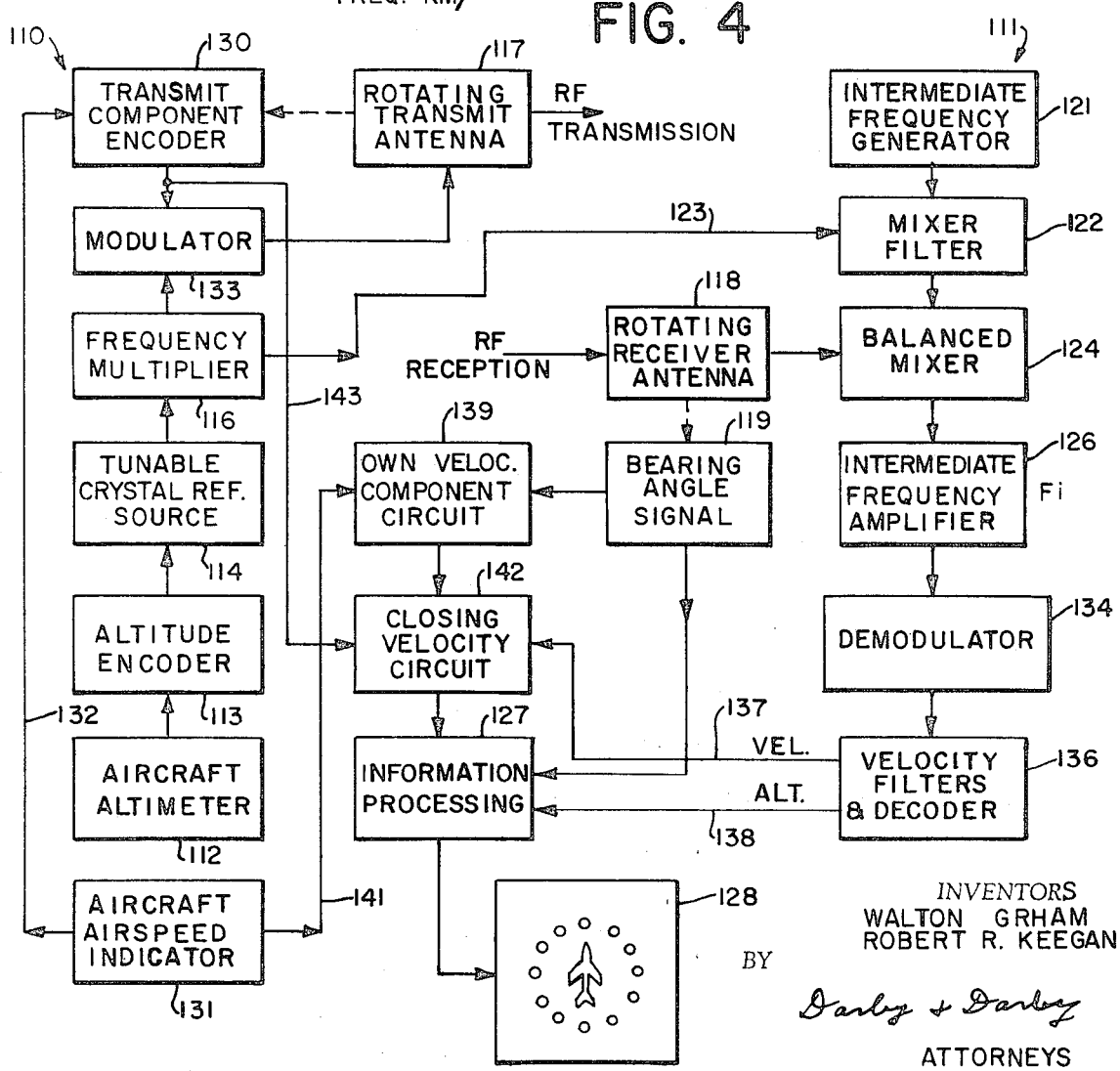

3,680,122

PILOT WARNING INDICATOR SYSTEM UTILIZING A TRANSMISSION OF SIGNALS WITHIN THE ABSORPTION BAND OF THE OXYGEN SPECTRUM

FIELD OF THE INVENTION

The invention relates to pilot warning or proximity indicator systems and more particularly to systems for preventing aircraft collisions wherein equipment is provided to indicate the positions of other aircraft whose relative proximity, altitude and velocity suggest the hazard of a potential collision.

BACKGROUND OF THE INVENTION

The context within which the present invention will be described, relates to the hazard of aircraft collisions, and while minimizing this danger is a primary objective of the invention, it is to be understood that the invention is not expressly limited to such use.

It has been found that the greatest danger from midair collisions exists in the increasingly congested air space surrounding major airport hubs. Heretofore, several collision avoidance techniques have been proposed, each of which has certain disadvantages, with the result that a system which substantially meets the needs at a reasonable cost has not been developed. The cost factor is particularly important with small (general aviation) aircraft which are far more numerous than commercial airline aircraft.

One common method of making range estimates consists in providing aircraft with a transmitter-receiver combination commonly called a transponder. Each aircraft transmits and encoded interrogating signal, which when received by the transponder unit of proximately located aircraft, triggers the transmission of a coded reply which identifies the aircraft. The reply is received by the interrogating unit and may indicate the bearing and distance parameters of one aircraft relative to the other. Such a system works well in sparsely populated air space, however under conditions of high aircraft population, as for example in and around airfield traffic patterns, it becomes difficult to sort out replies to one's own interrogation from the totality of replies transmitted. The necessary equipment to perform reliably in such situations becomes unacceptably complex.

Position data between aircraft is also obtained by transmit and receive apparatus in what is known as a time frequency system. This system requires extremely accurate synchronization of transmit pulses and generally requires a complexity of apparatus unsuitable for a general purpose pilot warning indicator system as contemplated here.

Systems exist in which range control depends primarily upon the fact that the detected power of an electromagnetic wave is inversely proportional to the square of the distance from its source. Based upon such a premise, and also upon the fact that an uncertainty of ±10dB in received power levels is typical for systems of this nature, simple computations reveal the fact that if a minimum detection range of 1.5 miles is desirable, then on the average the range of the system would be 4.75 miles with detection over a distance of 15 miles occasionally occurring. Considering the concentration of aircraft in the air space surrounding an airport any pilot warning system which undertakes to inform a pilot who may be concentrating primarily on landing procedures, not only of proximate aircraft but also of those aircraft which happen to be fifteen or more miles distant, would be impractical.

Accordingly, the present invention uses a transmitter having selected output parameters of frequency and power, with the frequency being in an absorption band of the spectrum of oxygen for the purpose of significantly emphasizing absorption and attenuation losses of energy from the propagated signal, thereby effectively to limit the range of the transmitter. For example, assuming as before a ±10dB uncertainty in power levels, and in addition assuming that atmospheric attenuation losses are approximately 5 dB per mile, then if it is desirable to have a minimum range of 1.5 miles, the average range of such a system would be 2.56 miles and the maximum range 3.85 miles. Note that the maximum range is less by a factor of four than in the prior example, yielding an area reduced by approximately 16 times. Undesired warnings would be correspondingly reduced.

The invention also provides circuits to distinguish between aircraft located at an altitude within a predetermined vertical proximity to the subject aircraft altitude, therefore presenting a potential collision hazard, and those aircraft located beyond and unlikely to interfere. As will be described in detail below, the output frequency of a transmitter of the present system will be responsive to the particular altitude of its aircraft. The receiving unit of an aircraft is provided with circuits for comparing a received signal with the output signal from the aircraft's transmitter, thereby to generate a resultant signal representative of the difference in altitude between the subject aircraft and the source of the received signal. If the altitude differential is greater than the predetermined minimum then circumstances do not present a real danger and the resultant will be rejected by the receiver so as not to alarm the pilot. Such a system therefore will apprise a pilot of the presence of aircraft within predetermined lateral and vertical proximities.

Since it is possible that aircraft which meet the criteria discussed above may nevertheless be traveling in such a direction as not to present a potential hazard, the invention in a refined embodiment is capable of distinguishing such aircraft which do not require attention. Accordingly, the transmitting unit of the present system may be provided with a rotatable transmit antenna and with means to provide antenna bearing information to a computing circuit which also receives encoded air speed information. The computing circuit determines the velocity component of the aircraft in the direction of any instantaneous position of the antenna and controls a modulator to impose this information on the transmitted signal. A received signal will be modulated with velocity information which may then be recovered by the receiving unit and compared to the velocity information impressed upon the output signal.

The relative closing speed between the two aircraft may be computed in this way. When the closing speed is positive or greater than a predetermined minimum, it will be desirable to display to the pilot the relative bearing of the source of such a signal. In addition to or in place of closing velocities, transverse velocity components can be used to determine the transverse relative velocity component as a measure of collision hazard.

Obviously, analog or digital computation techniques may be used for computing velocity component or for other computations required in the systems herein disclosed.

It is one object of the present invention to provide a proximity indicator transmitter station in which the transmitter has a predetermined output frequency range within the absorption band of the oxygen spectrum.

Another object of the present invention is to provide a proximity indicator transmitter station in which the frequency of the transmitter may be varied within its range corresponding to variations in ambient atmosphere density in a sense such that variations of signal absorption due to variations in density are partially offset.

Still another object of the present invention is to provide a pilot warning system for aircraft having the capability of detecting other aircraft within a predetermined lateral proximity generally corresponding to the visual range of a pilot.

A further object of the present invention is to provide a pilot warning indicator system for aircraft having the capability of selectively detecting other aircraft at altitudes within a predetermined vertical proximity.

A still further object of the present invention is to provide a pilot warning indicator system with the capability to detect other aircraft having an azimuthal velocity component such as to represent a collision hazard.

BRIEF DESCRIPTION OF THE DRAWINGS

For a further understanding of the present invention, reference may be had to the accompanying drawings in which:

FIG. 3 is a graph, similar to that in FIG. 2, of curves of radio signal attenuation as a function of frequency for both oxygen and water vapor; and FIG. 4 is a block diagram of another embodiment of the proximity indicator system of the present invention.

BRIEF DESCRIPTION OF THE PREFERRED EMBODIMENTS

Figure 1:
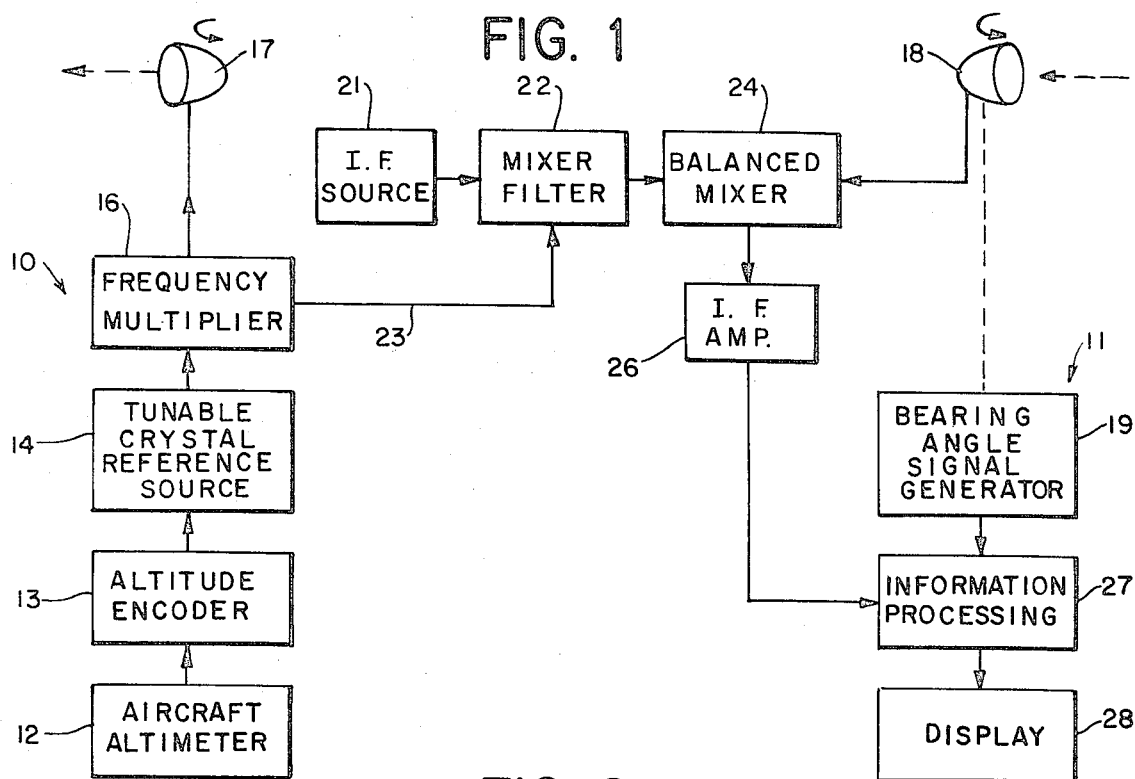
FIG. 1 is a block diagram of one embodiment of the proximity indicator system of the present invention.

Referring now to the drawings, and in particular to FIG. 1, there is illustrated schematically one embodiment of the present invention, although it will be understood that the system is not shown in the simplest form, but includes certain optional features, to be more fully explained hereinafter, which serve substantially to supplement and improve its effectiveness.

The present system contemplates preferably for each aircraft a transmitter unit generally indicated by reference numeral 10, and a receiver unit, indicated by reference numeral 11, although it should be noted that a vehicle which is minimally equipped according to the present invention may contain only the transmitter unit.

The transmitter unit 10 includes a barometric altimeter 12. By utilizing known techniques, the altimeter is arranged to provide an electrical signal which represents atmospheric pressure and hence (barometric) altitude. This signal is then supplied to an altitude encoder 13, the purpose of which is to convert the information into proper form to tune a tunable crystal reference source 14. The purpose of the tunable reference source is to provide controlled frequency which will vary precisely according to the altitude data supplied from the altimeter 12 and the encoder 13. A frequency multiplier 16 acts upon the signal from the reference source 14 and produces an ultra high output frequency for the transmitter, which is approximately within the range of 55 to 60 GHz, and which will also vary in accordance with the barometric data supplied to the tunable reference source.

It has been determined that an effective pilot warning indicator system, which will be based upon the ability of the pilot visually to locate and avoid proximate aircraft, ought only to indicate those aircraft which may be present within a predetermined range limit (for example, 4 miles from the subject aircraft at low altitudes; greater range is acceptable at higher altitudes). Signals having a frequency which falls within the range of 55 to 60 GHz, are within the absorption band of a major invariable constituent of the atmosphere, namely oxygen, with the result that the combination of inverse square propagation losses and attenuation owing to absorption by ambient oxygen at sea level atmospheric density, determines an operating range for the system which may be designed to have a maximum of 3.85 miles, with the minimum being 1.5 miles, and the nominal, 2.56 miles.

It is important to note that general aviation (non-commercial) aircraft may have different requirements for display of proximate aircraft due to the fact that they characteristically operate in the vicinity of small local airports characterized by periods where there are a quite large number of slow aircraft in the near vicinity. These craft may be practicing takeoff and landing procedure or other local operations.

It is particularly simple to adapt a general aircraft pilot warning indicator system according to the invention to such conditions by reducing the receiver sensitivity and thus raising the threshold for received signals. One might thereby reduce the nominal warning distance to 1 or 1½ miles, for example, greatly reducing the number of warning indications but still providing ample warning time for the local airport situation. It is possible to further reduce the receiver sensitivity to the sides of the aircraft so as to eliminate warning indications for aircraft on a leg of a local traffic pattern which is parallel to the course of the subject aircraft.

By changing only the receiver sensitivity of general aviation aircraft and leaving their transmitted power unchanged, there would be no adverse effect on the ability of commercial and other high performance aircraft to detect the general aviation aircraft at the desired (greater) range.

Figure 2:
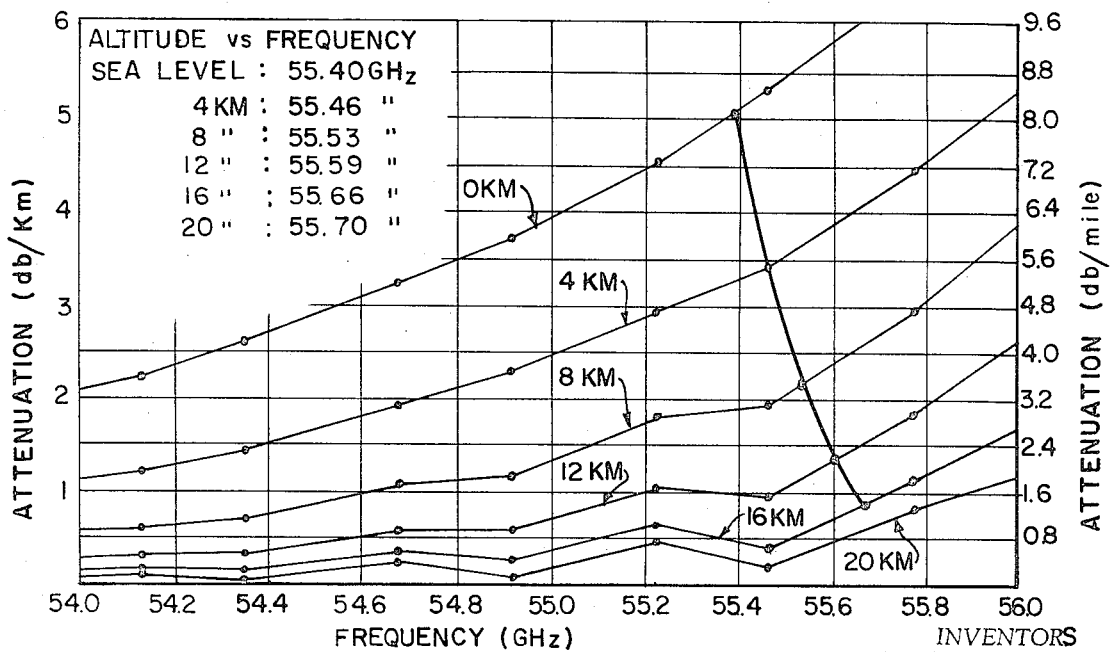
FIG. 2 is a graph showing especially radio signal frequency at approximately 54 to 56 GHz and energy attenuation of the signal as a function of frequency and altitude.

Referring to FIG. 2, it will be seen that the absorption of energy of an electromagnetic wave varies with the density of the atmosphere and hence with the barometric altitude. Specifically, for a given frequency, the attenuation of energy at higher altitudes is less than at lower altitudes. There is also a variation of attenuation with frequency. Fortunately, the attenuation with altitude is in the proper sense (though not necessarily in the proper amount) to provide increased warning distances at higher altitudes commensurate with normally higher aircraft velocities at higher altitudes. With a system based on absorption by oxygen, however, the variation of attenuation with altitude is somewhat greater than required, and it is therefore desirable to have an altitude-frequency code which causes the variation of attenuation with frequency to somewhat offset the variation of attenuation with altitude.

Other constraints are imposed on the altitude-frequency code. It is desirable that the change in frequency due to altitude coding be as small as is reasonably possible with an outside limit of perhaps one-half percent. With the previously described system parameters and associated gains and losses to yield a sea-level nominal range of 2.56 miles, one might then expect a high altitude detection range of 3.44 miles with a maximum of 5.42 miles and a minimum of 1.86 miles.

The actual selection of parameters and altitude-frequency code is subject to considerable variation, of course. Another coding arrangement with favorable characteristics is as follows:

$$O \text{ altitude} = 55.4 \text{ GHz}$$

Code increments = 0.5 MHZ Per 100 feet
Attenuation in dB/mi:
sea level = 8.1
4 $Km$ = 5.4
8 Km = 3.4
12 Km = 2.1
16 Km = 1.4
20 Km = 1.1

As may be seen in FIG. 2, by comparing the sea level curve with the curve labelled 20,000 feet, the absorption of energy from an electromagnetic wave varies with the density of the atmosphere. Specifically, for a given frequency, the attenuation of wave energy at higher altitudes is less than it would be at sea level. Accordingly, the present invention provides the means described above to increase or decrease the output frequency of the transmitter as the subject aircraft ascends or descends respectively, thereby partially to compensate for any change in the absorption value. The result is that the effective range of the system may be controlled throughout the various stages of flight to meet the needs at any one particular stage. For example, high altitude generally implies that an aircraft is travelling in substantially uncongested air space, at which time the relative closing speeds and separation distances of dangerously proximate aircraft are greater than they would be within the air space surrounding an airport. It is acceptable, or even desirable, therefore, to increase slightly the range of the system at higher altitudes whereby suitable information may be provided to assist a pilot in locating other aircraft while there is sufficient separation to allow for evasive maneuvers. The transmitter 10 of the present system, therefore, may be calibrated in a known way with respect to its frequency response to changing altitude, to provide for high-altitude detection at a range which may vary between a maximum of 5.42 miles to a minimum of 1.86 miles, with an average or nominal range of 3.44 miles.

In FIG. 3, date representing the attenuation of electromagnetic energy due to absorption by oxygen is plotted on a graph against frequency and is compared to a similar curve for water vapor attenuation. It may be seen that the absorption due to oxygen in the 50 to 60 GHz frequency range is well above that due to water vapor under ordinary circumstances, and therefore oxygen will be primarily responsible for controlling the range of the present system. Severe weather conditions such as heavy fog or rain will have some effect upon the range of the system; however, such conditions normally restrict the pilot's visibility as well, making visual detection of proximate aircraft impossible and reliance upon ground control mandatory.

It is to be understood that the present invention is not expressly limited to providing a pilot warning system wherein the output frequency parameter of the transmitter 10 is varied to effect the necessary range control, and an alternative or additional feature may be to vary the output power parameter proportionally to offset the effects of variations of absorption of electromagnetic energy due to different atmospheric densities at different altitudes.

In general, through the utilization of presently available oscillators (for example those manufactured by Hughes Aircraft Co.), it is possible to generate output power of approximately 500 milliwatts in the 55 to 60 GHz band. Because the effective region of wave propagation, and therefore the effective range of the system, is a function of the specific antenna type, as well as the frequency utilized and the output power of the transmitter, it may be desirable to provide the present system with a high gain directional antenna 17, in which case the antenna should be made to rotate to achieve frequent 360° coverage by the relatively narrow radiation pattern.

For purposes to be described below, the antenna 17 may be designed for example to radiate a fan-shaped half-power pattern of approximately 6° horizontal and ±45° vertical. Generally, it will be desirable to equip each aircraft with both the receiver 11 and the transmitter 10; however, in the event that only a minimal system is deployed, some aircraft will be equipped with only a transmitting unit, so they will be brought to the attention of higher performance, fully equipped aircraft.

With respect to the receiver 11, as depicted in FIG. 1 it may be seen that there is included a high gain directional receiving antenna 18 which is rotatably mounted on the aircraft. Antenna 18 may be designed potentially to provide gain characteristics slightly higher than those of antenna 17; for example, it may have the capability to effect a radiation fan pattern of approximately 1° to 2°.

Although the present invention is not to be limited by the type of antenna described, it will be understood that such an arrangement would enable the transmitter 10 to provide a nominal range of 2.56 miles even though generating only 10 to 30 mw of power. This would result in substantial cost and space saving with respect to the transmitting unit.

To maximize the effectiveness of the system, it may be advantageous to select the respective rotational speeds of the two antennas, so that the receive antenna will "see" a transmission pattern from a given transmit antenna at least once for each full rotation of the latter during the time that they are within range of each other. This may be accomplished by arranging for the antennas to rotate at different speeds. For example, it may be provided that the transmit antenna rotate once per second so that its radiation pattern will point at a given receive antenna for a period of one-sixtieth of a second. If the receive antenna is made to rotate 60 times per second, then it may be understood that the two antennas will "look" at each other once every second. Other advantages to be derived from providing the present system with a pair of rotatable antennas will become apparent hereinafter.

The antenna 18 is mechanically connected to a bearing angle signal generator 19, which puts out bearing information regarding the direction of a received signal. While the bearing information may be employed in conjunction with the signal from a conventional radio receiver to apprise the pilot of the approximate azimuthal location of the source of a received signal, such a relatively simple receiving unit would not provide altitude information which, as described above, is represented by the particular frequency of a received signal. Under these conditions, the pilot is appraised of the relative bearing of another aircraft having a certain range proximity even though that aircraft may be at such an altitude as to represent no potential hazard.

Accordingly, a preferable pilot warning system, as fully illustrated in FIG. 1, will be one in which each aircraft is equipped with a receiver selectively responsive to signal frequencies representative of altitudes close to the subject aircraft altitude. As will be described below, when each aircraft is fully equipped with the system shown, it will be a characteristic of the system to apprise the pilot of the relative bearing of other proximate aircraft which are located only within a predetermined minimum altitude range from the subject aircraft; for example, plus or minus 750 feet. A refinement is desirable in high performance commercial or military aircraft due to their high climb and descent rate capabilities. In such craft, rate of climb information should be utilized to compute the altitude about 10 to 15 seconds hence. This predicted altitude would be supplied to encoder 13.

One form of receiver may include an oscillator circuit or intermediate frequency source 21 which supplies a locally generated signal to a conventional mixer filter circuit 22. An electrical signal transmission path 23 connects the transmitter to the receiver to monitor the output frequency of the former and to supply this output to the conventional mixer filter. In the mixer filter, the ultra high frequency output signal is mixed with the constant intermediate frequency signal from the oscillator circuit 21 thereby to generate sum and difference frequencies, or beat frequencies, one of which may be separated by filters and supplied to a balanced mixer circuit 24.

The ultra high frequency input signal from the antenna 18, which has a frequency representative of the altitude of its source, is supplied to the conventional balanced mixer 24 simultaneously with the signal supplied from the frequency, mixer filter 22. The function of the balanced mixer 24 is similar to that of the mixer filter 22, in that both are basically frequency heterodyne devices. The balanced mixer may receive either the upper side or the lower side frequency which represent, respectively, the sum of the monitored output frequency and the locally generated intermediate frequency, or the difference between these two frequencies, generated in the mixer circuit 22. For clarity of explanation it will be assumed that the difference frequency is selected. The balanced mixer modulates the ultra high frequency signal received from the antenna 18, with the output from the mixer filter 22, and this process generates a second pair of sum and difference frequencies, the latter of which is significant as it will be representative of any difference in altitude between the subject aircraft and the source of the received signal. Considering the situation where the aircraft in question are at the same altitude, then the output signal from the antenna 17 of one aircraft will be at the same frequency as is the input signal received from the other aircraft by the antenna 18. If we assume, for purposes of illustration only, that the output from the mixer filter 22 consists of the lower side frequency, or difference of the monitored output from the transmitter 10 and the output from the I.F. source 21, it may be seen that the lower side frequency or difference frequency generated by the balanced mixer 24, in fact, will be the frequency of the signal generated in the I.F. source. Thus the frequency of the I.F. source represents zero altitude separation.

The lower side band frequency output from the balanced mixer 24 is supplied to an intermediate frequency amplifier 26. Amplifier 26, together with the remaining receiver apparatus, has a predetermined amplitude threshold receiving level such that the I.F. source frequency is accepted together with the adjacent frequency band corresponding to altitude differences for which warnings will be given. Amplifier 26 has a frequency characteristic which, in conjunction with transmitted power and other factors, determines the range at which other aircraft are detected.

Filters with a predetermined band width may be employed in connection with the intermediate frequency amplifier to select and amplify those frequencies which represent some predetermined altitude disparity range, for example, plus or minus 750 feet, between the pair of potentially threatened aircraft. Any signal from the balanced mixer which represents more than this predetermined maximum differential, will be rejected by the amplifier 26 on the presumption that an altitude differential of more than 750 feet should not require evasive action. Any signal which exceeds the threshold at the output of the amplifier 26 is then supplied to an information processing unit 27 simultaneously with the information regarding the bearing angle of the rotating antenna 18.

The information processing unit 27 includes a detector (or multiple detectors for different frequencies) for producing a response to a received signal of interest. In response to such signal, the information processing unit transmits the bearing angle signal to a display 28 which indicates to the pilot both the presence of a received signal and its relative bearing, i.e. the antenna bearing whereby the pilot is selectively apprised of laterally proximate aircraft located within a relevant vertical range. The display may be of a conventional type utilizing lamps or other illuminated indicators of bearing to the nearest ten degrees or with other selected accuracy.

Generally, it will be desirable for a pilot warning system to include reasonably obtainable expedients which may serve to avoid calling the pilot's attention unnecessarily to every aircraft which is within radio reception range and supposedly visual range. One example is the ability of the warning system shown in FIG. 1, and described above, to discriminate between aircraft having lateral proximity but insufficient altitude proximity to constitute a threat. A preferable warning system, however, would in addition be able to distinguish otherwise proximate aircraft which, in fact, are moving in a way which does not present a threat to the subject aircraft, and which therefore would not require the attention of the pilot.

Accordingly, a further embodiment of the present invention, which is illustrated schematically in FIG. 4 and incorporates the principles described above in connection with FIG. 1, includes means for impressing the output signal of the transmitter with the azimuthal velocity component of the transmitting aircraft.

Referring now to FIG. 4, it will be seen that certain components illustrated therein have been described in detail; however, to enhance understanding of the present embodiment, it will be desirable briefly to recapitulate. It is understood that a signal from the aircraft altimeter 112 is supplied to an altitude encoder 113 which converts the signal to a form appropriate to tune a crystal reference source 114 so that the ultimate output frequency of the transmitter is varied in accordance with a predetermined barometric altitude code. The relatively low radio frequency supplied by the reference source 114 is substantially raised in a frequency multiplier 116 to obtain the desired output frequency of approximately 55 to 60 GHz.

In accordance with the present embodiment, a transmitting antenna 117 is rotatably mounted on the aircraft and is provided with a conventional angle encoder to provide bearing information to a transmit velocity component encoder 130. An air speed indicator 131 supplies air speed data, by transmission path 132 to the velocity component encoder 130. The encoder 130 contains a computing circuit arranged to multiply repetitively the air craft speed by the cosine of the instantaneous angle between the antenna axis and the longitudinal axis of the aircraft (and such successive (bearing) angles registered throughout the circular scan pattern of the antenna). In this way there is calculated the velocity component of the transmitting aircraft for successive azimuthal reference points determined by the transmitting antenna axis.

The signal supplied by the transmit velocity component encoder 130 is a radio frequency signal which is variable over a predetermined range, for example, from 50 KHz to 950 KHz, and it is supplied to a modulating circuit 133 which receives simultaneously the ultra high frequency signal from the frequency multiplier 116. In the modulating circuit, the former is utilized to control the amplitude of the latter. The present embodiment of the invention therefore, provides for the output signal to be representative as to both the altitude (carrier frequency) and the horizontal azimuth velocity component of the transmitting aircraft (modulation frequency), the latter of which continues to change as the antenna 117 rotates. It is important to note that the computed velocity component will assume both positive and negative values. It will be desirable then, arbitrarily to consider those velocities communicated toward the front of the aircraft to be encoded positive, while those communicated toward the rear of the aircraft will be encoded negative. The importance of this vector quantity will become more readily apparent when it is considered in connection with the receiving unit 111, illustrated in FIG. 4, which has been partially described hereinabove in connection with FIG. 1.

To recapitulate, with respect to the receiver, the output carrier signal from the transmitting unit 110 is monitored by the receiving unit 111, being received through transmission path 123, and accordingly is supplied to the conventional mixer filter circuit 122, wherein it is heterodyned with a signal from the intermediate frequency generator 121.

One generated side frequency, which may be the difference, for example, is supplied to the balanced mixer 124, which is also supplied with an input carrier signal received by the rotating receive antenna 118, wherein a second heterodyning process occurs. One side frequency generated by this process will be representative of the difference in altitude between the aircraft which is transmitting the monitored signal and the aircraft which is transmitting the signal received by the antenna 118.

As has been described above in connection with the previous embodiment of the invention, the band widths of the intermediate frequency amplifier 126 may be selected so as to reject side band frequencies generated in the balanced mixer 124 which represent a vertical separation between the aircraft in question which is greater than the predetermined surveillance zone. Any signals which traverse and are consequently amplified by the amplifier 126 have originated from aircraft which are both laterally and vertically proximate sufficiently to constitute a possible collision threat.

The significance of the embodiment of FIG. 4 relates principally to the velocity component information which has been modulated on the output carrier signal from the transmitting unit 110, as described above. To utilize this information it will be necessary for a receiving unit 111 to recover the modulation envelope from an input carrier signal, and for this purpose a conventional detection or demodulating device 134 may be inserted into the system to receive the signal supplied by the amplifier 126.

It should be noted that it may be desirable to provide post detection circuits between the intermediate frequency amplifier 126 and the information processing circuit 127.

Upon recovery of the wave envelope, which represents the velocity component of the source of the input carrier signal along the horizontal azimuth of one aircraft relative to the other, it will be supplied to filter array 136 which contains a plurality of 10 KHz filters and a decoder. The array contains a predetermined number of filters organized incrementally to encompass a predetermined frequency range, for example 50 KHz to 950 KHz, so that any possible envelope signal which represents velocity component information will be able to pass through after detection. Background noise, circuit noise or other types of interference will be discriminated against. By conventional techniques, a signal which traverses the filters is detected and its frequency converted into code and communicated along transmission path 137 to a closing velocity circuit 142, the purpose of which will be more fully explained hereinafter. The output 138 is energized for any signal communicated through path 137 as an indicator that some signal indicating an aircraft with some relevant velocity component has traversed the filter array 136.

As has been described above in connection with FIG. 1, digital bearing information regarding the rotating receive antenna 118 is transmitted by the bearing angle signal generator 119 and is supplied to what is defined as "own velocity component circuit" 139. This circuit monitors the signal produced by the air speed indicator 131, through the path 141, and functions essentially as does the transmit velocity component circuit 130 in the transmitting unit 110. The difference is that the circuit 139 bases its computations of the magnitude and direction of velocity components upon bearing information derived from the rotating receive antenna 118. Thus, there is present at the closing velocity circuit 142 information representing the magnitude and sense of the horizontal azimuthal velocity component of each aircraft relative to the other along a line of sight between the aircraft (in normal operation, the two antennas transmitting and receiving, must be facing for signal reception to occur). Supplied with such information, the closing velocity circuit 142 may combine the velocities derived from monitored and received signals algebraically to compute the net closing velocity. The output from the closing velocity circuit is supplied to the information processing circuit 127 to permit rejection of signals which represent that the aircraft in question may be receding from each other at a rate which is sufficient to eliminate any necessity for alarming the pilot. It may be established, for example, that the information processing circuit is to reject all observed negative closing velocities which are greater than minus 50 knots. Thus, only received signals within the prescribed limitations result in the bearing angle from generator 119 being displaced on display 128. It is important to note that it is not essential to the present embodiment of the invention that precise air speed information be obtained. It may be possible for low performance aircraft in particular to omit the means by which actual aircraft air speed data is obtained and to substitute therefor a nominal or constant aircraft speed that would approximate the cruising speed of the aircraft. This would not appear to interject any unacceptable error into the system.

It is proposed that the transmitting antenna, 17 and 117 respectively in FIGS. 1 and 4, would be most effective if located on the vertical tip of the tail portion of the aircraft, thereby to insure that it will not be obscured during normal turns. Such a location would maximize the effectiveness of antennas having a transmitting pattern of approximately plus or minus 45 degrees relative to the horizontal. It is to be understood, however, that the present invention is not to be limited by either the type or location of such antennas, and that any suitable antenna which will provide reasonably full coverage of directions of interest may be employed in an appropriate location.

In the event that each aircraft is equipped with both a transmitting and receiving unit, it will be desirable to minimize the possibility that the receiving antenna might detect the signal being transmitted. Accordingly, it has been found that the receive antenna is appropriately located on the bottom of the aircraft to provide for some isolation of the two antennas.

As has been mentioned above, it is desirable to provide for selective display of received signals since, for the purposes of the present system, a pilot probably need not be warned of a hazard wherein the responsibility is deemed solely on the pilot of the other aircraft. It may not be necessary, therefore, that a pilot be apprised of the presence of proximate aircraft located behind the subject aircraft, since under such circumstances the former aircraft would not be visible to the pilot of the latter and therefore any required evasive action would have to be initiated by the intruder, who presumably would have a maximum visual advantage. Accordingly, an alternate location for the receive antenna 18 may be underneath the nose of the subject aircraft.

The system is readily capable of evaluating received signal level and providing two levels of warning (a first advisory warning and a second mandatory warning). This would provide for the circumstance in which more than casual effort was needed for the pilot to visually observe the proximate aircraft. A particular example would be when the intruding aircraft was below and in front of the subject aircraft.

The possibility may arise, especially with respect to the former arrangement of the antennas, that despite such an attempt at isolation, false signals might be detected by the receive antenna which result from reflections of the transmitted signal from certain portions of the aircraft, such as for example, the engine nacelles. In this regard, it is important to note that positioning the receive antenna at the front of an aircraft, as mentioned above, will also contribute to minimizing the possibility that spurious reflections would interfere with the proper functions of the present system.

If the antenna 118 detects a spurious reflection of the signal transmitted from the antenna 117, then the modulation envelope recovered from the received carrier signal will represent velocity component information which is precisely the same as that which is employed to modulate the output carrier in the modulation circuit 133 of the transmitting unit 110. One way to test for spurious reflections therefore would be to compare the output from the velocity filters 136 with the output from the transmit velocity component encoder 130. Such a comparison might be made, for example, in the closing velocity circuit 142, and the arrow 143 illustrates this possibility schematically in FIG. 4. The circuit may be designed to reject the received signal, once it is determined that the respective velocity component information is indeed the same. Of course, legitimate receive signals ought not to be obscured, and this may be avoided if, upon an affirmative comparison as above, provision is made to shift slightly the modulation frequency affecting the output carrier of the transmitter. If a concomitant shift is apparent for the input signal, as would be determined by the closing velocity circuit 142, then such a signal would be confirmed to be spurious and the system would again reject it. It would be possible therefore to minimize the chance of erroneous evaluation of signals as spurious over any substantial number of antenna sweep cycles.

What is claimed is:

1. A proximity indicator system comprising:
    a radio signal transmitter having a predetermined output frequency range within an absorption band of the spectrum of a major invariable constituent of the atmosphere;
    a transmitting antenna connected to receive the output of said transmitter;
    a receiving antenna;
    a radio receiver having a predetermined amplitude threshold receiving level attuned to at least a portion of said output frequency range and connected to receive the signal from said receiving antenna; and
    a display connected to said receiver output to indicate reception of a signal at an amplitude above said predetermined threshold level.

2. An airborne proximity indicator system comprising:
    a low power radio signal transmitter having a predetermined output frequency range for which the sea level absorption of a constituent of the atmosphere other than water is at least 3 dB per kilometer;
    an airborne transmitting antenna connected to receive the output of said transmitter;
    a horizontally scanning airborne receiving antenna;
    an airborne radio receiver tunable to at least a portion of said output frequency range and connected to detect signals from said receiving antenna which have an amplitude exceeding the threshold level of said receiver; and an indicator connected to the output of said receiver to indicate reception of certain ones of signals detected by said receiver;

whereby signals originating from aircraft beyond the distance of unaided visibility are generally attenuated sufficiently to be undetected while signals from close, possibly hazardous, aircraft are reliably detected and indicated under good visibility conditions.

3. Apparatus as claimed in claim 2 further including means for communicating the altitude of the transmitting aircraft comprising:

means for generating a signal representing the altitude of said transmitting aircraft;
means for modulating transmissions from said transmitting antenna in accordance with said altitude signal; and
means for receiving and demodulating said transmission to produce a signal corresponding to said transmitting aircraft altitude.

4. Apparatus as claimed in claim 3 wherein said antennas are rotating antennas and the rotational motion of said transmit antenna is asynchronous with the motion of said receive antenna.

5. Apparatus as claimed in claim 2 wherein said antennas are rotating antennas and the rotational motion of said transmit antenna is asynchronous with the motion of said receive antenna.

6. Apparatus as claimed in claim 5 further including means for communicating an azimuthal component of the velocity of the transmitting aircraft comprising:

means for generating a signal representing the instantaneous azimuthal bearing angle of said transmitting antenna;
means for computing from said bearing angle and the aircraft total velocity the azimuthal velocity component; and
means for modulating transmissions from said transmitting antenna in accordance with said azimuthal velocity component.

7. Apparatus as claimed in claim 6 wherein said frequency range has an absorption at sea level between 5 and 10 dB per kilometer.

8. Apparatus as claimed in claim 2 wherein said frequency range has an absorption at sea level between 5 and 10 dB per kilometer.

9. An airborne proximity indicator system comprising:

a radio signal transmitter having a predetermined output frequency range within an absorption band of the spectrum of a major invariable constituent of the atmosphere;
a horizontally scanning airborne transmitting antenna connected to receive the output of said transmitter;
a horizontally scanning airborne receiving antenna for receiving transmissions from said transmitting antenna;
an airborne radio receiver tunable to a least a portion of said output frequency range and connected to detect signals from said receiving antenna which have an amplitude exceeding the threshold level of said receiver; and
an indicator connected to the output of said receiver to indicate reception of certain ones of signals detected by said receiver.

10. Apparatus as claimed in claim 9 further including means for communicating an azimuthal component of the velocity of the transmitting aircraft comprising:

means for generating a signal representing the instantaneous azimuthal bearing angle of said transmitting antenna;
means for computing from said bearing angle and the aircraft total velocity the azimuthal velocity component; and
means for modulating transmissions from said transmitting antenna in accordance with said azimuthal velocity component.

11. Apparatus as claimed in claim 10 wherein the scan of said transmit antenna is asynchronous with the scan of said receive antenna.

12. Apparatus as claimed in claim 9 further including means for communicating the altitude of the transmitting aircraft comprising:

means for generating a signal representing the altitude of said transmitting aircraft;
means for modulating transmissions from said transmitting antenna in accordance with said altitude signal; and
means for receiving and demodulating said transmission to produce a signal corresponding to said transmitting aircraft altitude.

13. Apparatus as claimed in claim 12 wherein said frequency range has an absorption at sea level between 5 and 10 dB per kilometer.

14. An airborne proximity indicator system comprising:

a radio signal transmitter having a predetermined output frequency range within an absorption band of the spectrum of a major invariable constituent of the atmosphere;
a horizontally scanning transmitting antenna connected to receive the output of said transmitter;
a horizontally scanning airborne receiving antenna having a scan rate differing by at least a factor of ten from that of said transmitting antenna;
an airborne radio receiver tunable to at least a portion of said output frequency range and connected to detect signals from said receiving antenna which have an amplitude exceeding the threshold level of said receiver; and
an indicator connected to the output of said receiver to indicate reception of certain ones of signals detected by said receiver.

15. Apparatus as claimed in claim 14 further including means for communicating the altitude of the transmitting antenna comprising:

means for generating a signal representing the altitude of said transmitting aircraft;
means for modulating transmissions from said transmitting antenna in accordance with said altitude signal, and
means for receiving and demodulating said transmission to produce a signal corresponding to said transmitting aircraft altitude.

16. An airborne proximity indicator system comprising:

a radio signal transmitter having a predetermined output frequency range within an absorption band of the spectrum of a major invariable constituent of the atmosphere;
a transmitting antenna connected to receive the output of said transmitter;
a horizontally scanning airborne receiving antenna;
an airborne radio receiver tunable to at least a portion of said output frequency range and connected to detect signals from said receiving antenna which have an amplitude exceeding the threshold level of said receiver; and
an indicator connected to the output of said receiver to indicate reception of certain ones of signals detected by said receiver.

17. Apparatus as claimed in claim 16 further including means for communicating the altitude of the transmitting aircraft comprising:

means for generating a signal representing the altitude of said transmitting aircraft;
means for modulating transmissions from said transmitting antenna in accordance with said altitude signal; and
means for receiving and demodulating said transmission to produce a signal corresponding to said transmitting aircraft altitude.

18. Apparatus as claimed in claim 16 wherein said said antennas are rotating antennas.

19. Apparatus as claimed in claim 18 further including means for communicating an azimuthal component of the velocity of the transmitting aircraft comprising:

means for generating a signal representing the instantaneous azimuthal bearing angle of said transmitting antenna;
means for computing from said bearing angle and the aircraft total velocity the azimuthal velocity component; and
means for modulating transmissions from said transmitting antenna in accordance with said azimuthal velocity component.

20. Apparatus as claimed in claim 16 wherein said frequency range has an absorption at sea level between 5 and 10 dB per kilometer.

* * * * *